United States Patent [19]
Tatavoosian et al.

[11] Patent Number: 5,544,019
[45] Date of Patent: Aug. 6, 1996

[54] DISPLAY SYSTEM

[75] Inventors: Vanacan Tatavoosian, Mission Vejo; Robert P. Helstern, Costa Mesa; John J. Lombardo, Lake Forest, all of Calif.

[73] Assignee: Eaton Corporation, Cleveland, Ohio

[21] Appl. No.: 393,161

[22] Filed: Feb. 21, 1995

[51] Int. Cl.$^6$ ........................... G01D 11/28
[52] U.S. Cl. .............. 362/23; 362/30; 362/326; 362/339; 200/313; 200/314
[58] Field of Search ................. 200/314, 310, 200/313; 362/23, 26, 27, 28, 29, 30, 31, 351, 329, 330, 326, 333, 336, 339, 812; 40/564, 580, 546, 573

[56] References Cited

U.S. PATENT DOCUMENTS

| | | |
|---|---|---|
| 1,673,876 | 6/1928 | Koeppler . |
| 2,273,353 | 2/1942 | Harris . |
| 2,402,206 | 6/1946 | Powers . |
| 2,717,121 | 9/1955 | Luhn . |
| 3,163,739 | 12/1964 | Hutt . |
| 3,472,986 | 10/1969 | Stallman . |
| 3,574,993 | 4/1971 | Black ........................ 362/30 X |
| 3,973,342 | 8/1976 | Gubela ....................... 40/582 |
| 4,240,220 | 12/1980 | Smith ........................ 40/564 |
| 4,631,377 | 12/1986 | Imazeki et al. ............... 200/314 |
| 4,975,807 | 12/1990 | Ohashi ........................ 362/28 |
| 5,295,050 | 3/1994 | Helstern et al. ............... 362/27 |

*Primary Examiner*—Denise L. Gromada
*Assistant Examiner*—Thomas M. Sember
*Attorney, Agent, or Firm*—Tarolli, Sundheim, Covell, Tummino & Szabo

[57] ABSTRACT

An improved display system includes a selectively energizeable light source which is disposed within a housing. A panel, formed of transparent material, is connected with the housing and has an outer side surface which is exposed to ambient light and an inner side surface which is exposed to light from the light source when the light source is energized. Indicia is disposed between the light source and the panel. The indicia is observable through the panel when the light source is energized and is obscured when the light source is de-energized. An array of pyramidal projections are disposed on the outer side of the panel. The array of pyramidal projections extend across the indicia so that light from the light source passes through the pyramidal projections to enable the indicia to be observed when the light source is energized. The panel is formed of a polymer. The surfaces of the pyramidal projections are repaired by a thin film of a monomer of the same composition as the polymer forming the panel.

21 Claims, 3 Drawing Sheets

DISPLAY SYSTEM

BACKGROUND OF THE INVENTION

A known display system has indicia which is readable in bright sunlight when a light source within the display system is energized. However, when the light source in the display system is not energized, the indicia is not readable, even in bright sunlight.

This known display system includes a prism having a pair of light receiving faces disposed in planes which intersect at an apex. When a light source is energized, light is transmitted to the light receiving faces of the prism. The light is transmitted through the prism from the light receiving faces to a light emitting face of the prism. The light emitting face of the prism has a series of parallel V-shaped grooves. The V-shaped grooves have side surfaces which disperse rays of light transmitted from the light receiving faces of the prism to the light emitting face of the prism.

A display panel is disposed in front of the light emitting face of the prism. Indicia on the display panel is exposed to light transmitted from the light emitting face of the prism. This indicia is observable when the source of light is energized, even when the display panel is exposed to bright sunlight. However, the indicia on the display panel is obscured when the source of light is not energized. This known display system is disclosed in U.S. Pat. No. 5,295,050 issued Mar. 15, 1994 and entitled "Display System".

SUMMARY OF THE INVENTION

The present invention provides a new and improved display system which has minimum specular reflectance. The display system is relatively compact and contains indicia which is readable in bright sunlight when a light source within the display system is energized. However, the indicia is not readable, even in bright sunlight, when the light source in the display system is de-energized.

The display system includes a light source which is disposed within a housing. A panel is connected with the housing and is formed of transparent material. Indicia is disposed in the housing at a location between an inner side of the panel and the light source. The indicia is observable through the panel when the light source is energized. The indicia is obscured when the light source is de-energized.

The outer side of the panel includes an array of pyramidal projections which extend across the indicia. The pyramidal projections disperse light to minimize specular reflectance. This feature is particularly advantageous when the outer side of the panel is exposed to bright sunlight.

Indicia formed by opaque and transparent areas is disposed between the light source and an inner side of the panel. A body of light diffusing material is disposed between the indicia and the light source. When the panel is exposed to bright sunlight, the sunlight is transmitted through the transparent areas of the indicia into the body of light diffusing material. The amount of light reflected from the transparent areas of the indicia is the same as the amount of light reflected from the opaque area of the indicia. Therefore, the indicia is obscured in bright sunlight.

The panel is formed of a transparent polymer. A thin film of a monomer used to make the polymers of which the panel is formed, is applied over the pyramidal projections on the outer side of the panel. The thin film of the monomer only partially eliminates roughened areas on side surfaces of the pyramidal projections. This enables the pyramidal projections to have an exterior surface which is rough enough to disperse sunlight and avoid specular reflection while still having a pleasing satin appearance.

BRIEF DESCRIPTION OF THE DRAWINGS

The foregoing and other features of the invention will become more apparent upon a consideration of the following description taken in connection with the accompanying drawings, wherein.

DESCRIPTION OF ONE SPECIFIC PREFERRED EMBODIMENT OF THE INVENTION

Figure 1:
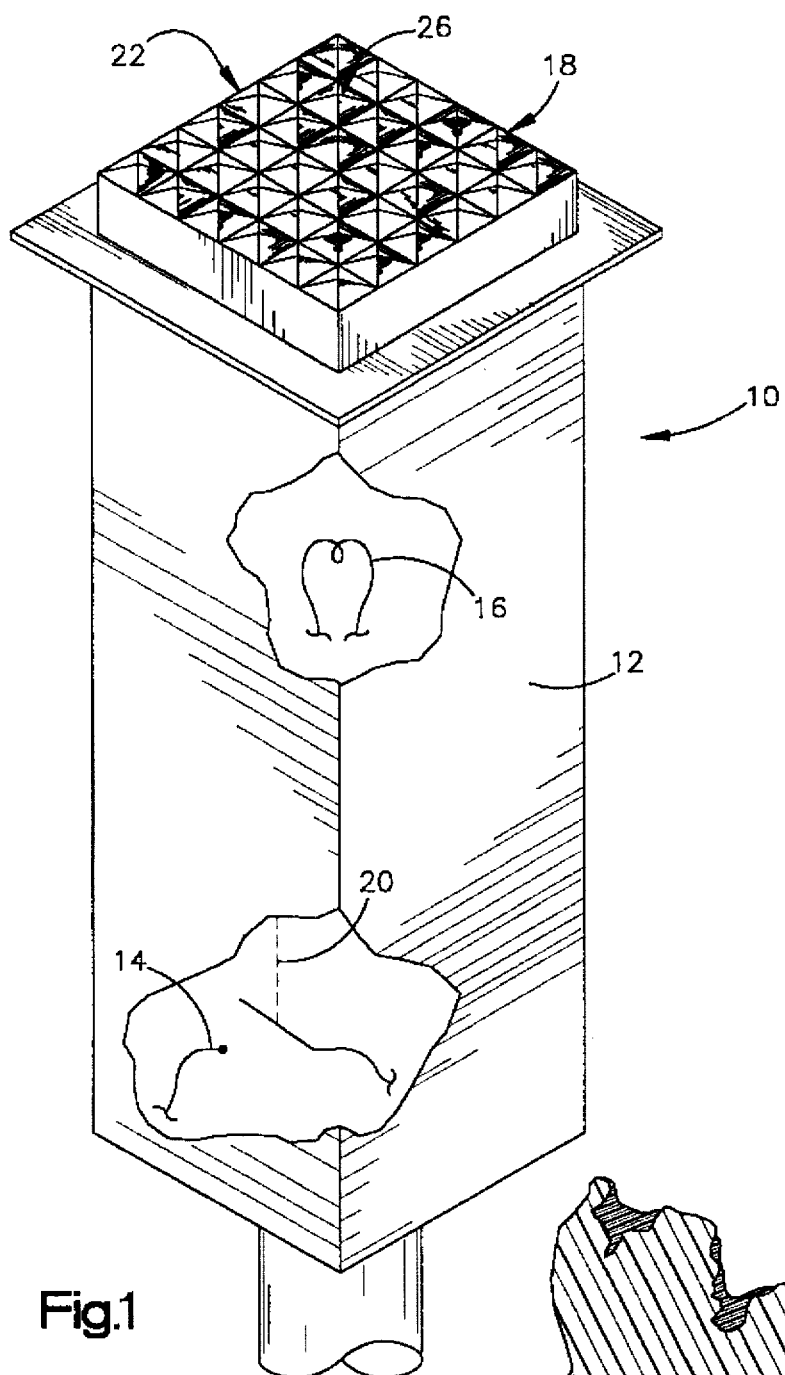
FIG. 1 is a schematic pictorial illustration of a switch assembly having a display system constructed in accordance with the present invention.

A switch assembly 10 (FIG. 1) has a rectangular housing 12 which encloses a switch 14 and a light source 16. The light source 16 may be incandescent, such as a bulb, or may be solid-state, such as a light emitting diode. A pushbutton 18 is manually actuatable to operate the switch 14 between open and closed conditions. When the pushbutton 18 is depressed, a mechanism, indicated schematically at 20 in FIG. 1, effects operation of the switch 14 from the open condition illustrated in FIG. 1 to a closed condition. Upon operation of the switch 14 to the closed condition, the light source 16 is energized.

When the light source 16 is energized, light is transmitted through an improved display system 22 in the pushbutton 18. Upon energization of the light source, indicia in the display system 22 becomes visible to an observer. When the light source 16 is de-energized and the switch 14 is in the illustrated open condition, the indicia in the display system 22 is obscured, even when the display system is directly exposed to bright sunlight.

In accordance with one of the features of the present invention, there is minimal specular reflectance from the display system to an observer. Thus, even when the display system is directly exposed to bright sunlight, there is minimal reflectance from the display system directly back to the eye of the observer. This eliminates glare which may become very annoying to an observer when the display system 22 is exposed to bright sunlight for a substantial length of time. In addition, excessive specular reflectance may cause an observer to believe that the light source 16 in the switch assembly 10 is energized and the switch 14 closed when the light source is actually de-energized and the switch open.

The display system 22 includes an outer panel 26 (FIGS. 1–3) which is exposed to ambient light, that is, light from the environment around the display system 22. A layer 28 (FIG. 3) of indicia is provided adjacent to an inner side of the panel 26. The layer 28 of indicia contains information to be transmitted to an observer when the light source 16 (FIG. 1) is energized. A body 30 (FIG. 3) of light diffusing material is disposed between the layer 28 of indicia and the light source 16.

The outer panel 26 (FIGS. 2 and 3) is formed of a transparent material having a high degree of optical clarity. In one specific embodiment of the invention, the outer panel 26 was formed of a thermoplastic resin of polymerized methyl methacrylate, that is, polymethyl methacrylate. Of course, the outer panel 26 could be formed of other materials which have a high degree of optical clarity.

In accordance with one of the features of the present invention, the outer panel 26 has an outer side 34 with an array of pyramidal projections 36. The array of pyramidal projections 36 extends across the entire exposed outer side 34 of the panel 26. The pyramidal projections 36 form an array of discontinuities which have the same configuration and disperse reflection from the outer side 34 of the panel 26. This tends to minimize the amount of specular reflection from the outer side 34 of the panel 26 when the panel is exposed to direct sunlight.

When the light source 16 is energized, a substantial amount of heat is transmitted from the light source to the pushbutton 18. When a relatively high wattage light source 16 is utilized, the heat transmitted to the pushbutton 18 may tend to make the pushbutton uncomfortable to the touch of a person actuating the switch assembly 10. The pyramidal projections 36 increase the surface area of the pushbutton 18 and the dissipation of heat from the pushbutton. By increasing the surface area of the pushbutton and the rate of heat transfer from the pushbutton, the pushbutton is relatively cool when the light source 16 is energized.

By forming an irregular surface which is engaged by the finger of a person actuating the pushbutton 18, the pyramidal projections 36 reduce any tendency for the finger to slip as it is pressed against the pushbutton. Since the pyramidal projections 36 increase the surface area and the heat dissipation from the pushbutton 18, the pushbutton is relatively cool. The combined effect of promoting heat transfer from the pushbutton 18 and minimizing slippage of a finger along the surface of the pushbutton facilitates actuation of the pushbutton by an operator.

Figure 3:
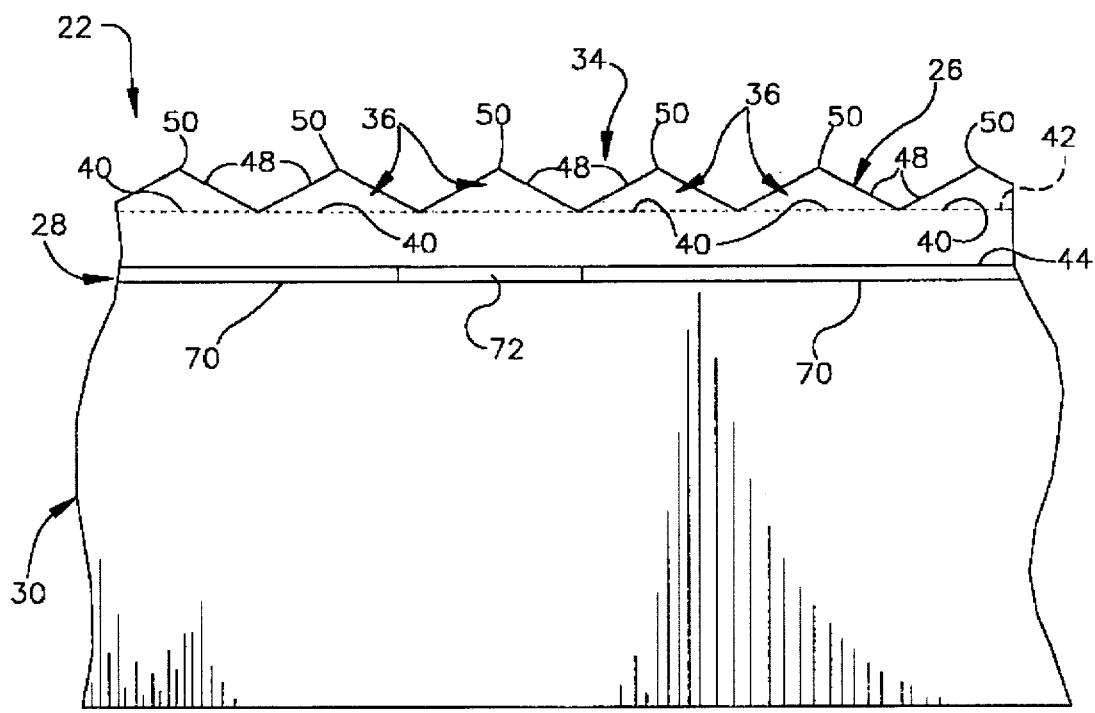
FIG. 3 is a fragmentary side elevational view, taken generally along the line 3—3 of FIG. 2, illustrating the relationship of the pyramidal projections on the outer side of the panel to indicia and a body of light diffusing material disposed between the panel and a light source.

Each of the pyramidal projections 36 has a polygonal base 40 (FIG. 3). The polygonal base 40 of each of the pyramidal projections 36 is disposed in a flat plane 42, which has been indicated in dashed lines in FIG. 3. The flat plane 42 extends parallel to an inner side 44 of the panel 26.

Figure 2:
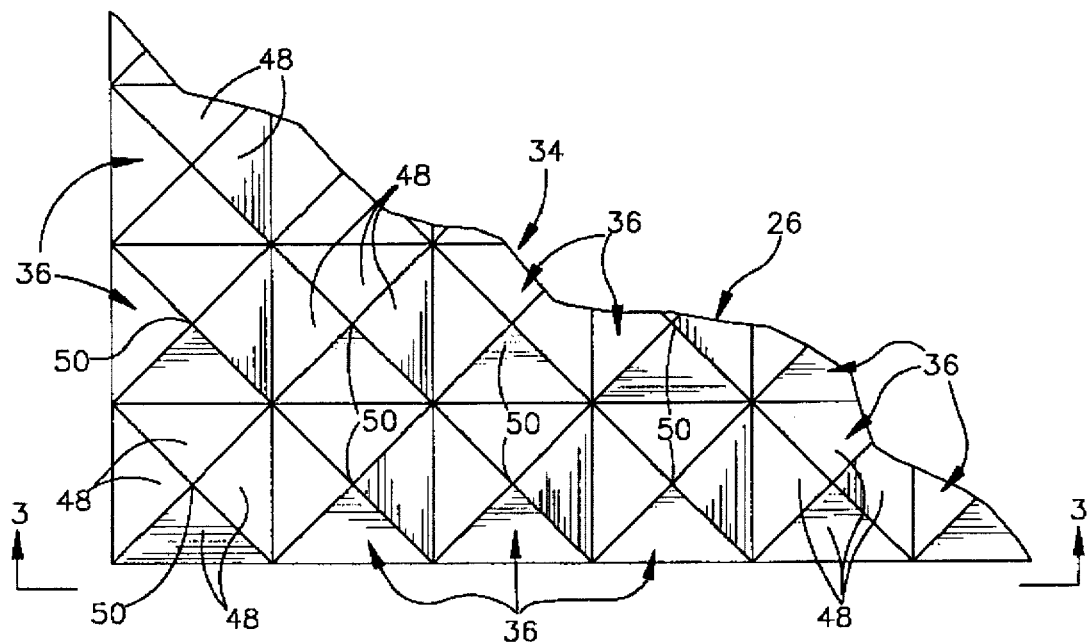
FIG. 2 is an enlarged fragmentary top plan view illustrating pyramidal projections on an outer side of a panel in the display system of FIG. 1.

Each of the pyramidal projections 36 includes a plurality of flat side surfaces 48 (FIGS. 2 and 3). Each of the flat side surfaces 48 extends away from a base 40 of a pyramidal projection 36 to an apex 50 of the pyramidal projections.

In the embodiment of the invention illustrated in FIGS. 2 and 3, the pyramidal projections 36 have square bases 40. Each of the pyramidal projections 36 has four flat side surfaces 48 which extend from the base 40 of the pyramidal projection to an apex 50. The flat side surfaces 48 of the pyramidal projections 50 are skewed at an angle of 30° to the plane 42 which contain the bases of the pyramidal projections 36. The four flat side surfaces 48 of each of the pyramidal projections 36 have the same triangular configuration and the same surface area.

In one specific embodiment of the invention, the square base 40 of each of the pyramidal projections 36 had a length, along one edge, of approximately 0.0116 inches. Each of the pyramids had a height, from the plane 42 to the apex 50, of 0.002 to 0.003 inches. The foregoing specific dimensions for the pyramidal projections 36 have been set forth herein only for purposes of clarity of description and not for purposes of limitation of the invention. It is contemplated that the pyramidal projections 36 could have different dimensions if desired. It is also contemplated that the pyramidal projections 36 could have a different configuration from the illustrated configuration. For example, each of the pyramidal projections 36 could have only three side surfaces 48 and have a triangular base rather than a square base.

Although the apex 50 of each of the pyramidal projections 36 has been illustrated as being sharply defined, in one specific embodiment of the invention, the apex of each pyramidal projection was slightly rounded. Thus, at the location where the four side surfaces intersected at the peak or apex 50 of a pyramidal projection 36, the apex was not sharply defined but rather had a slightly rounded configuration.

It is contemplated that the pyramidal projections 36 may be formed in a panel of transparent material in many different ways. However, in one specific embodiment of the invention, the pyramidal projections were formed in a major side of a panel formed of polymethyl methacrylate by a machining process. The machining process cut a major side 34 of the panel to form the pyramidal projections 36.

During the machining process to form the pyramidal projections 36, linear parallel grooves were formed in the major side 34 of the panel. A second series of parallel linear grooves were then formed with their longitudinal axes extending perpendicular to the longitudinal axes of the parallel grooves of the first series of grooves. The grooves in each of the series of grooves may be formed by repetitive strokes using a single cutting tool or may be formed with a plurality of cutting tools.

During the cutting of the panel 26 to form the pyramidal projections 36, slight imperfections are formed in the material of the panel as material is cut away. Thus, as a cutting tool engages the material of the panel and cuts a portion of the panel away to form the portion of one of the pyramidal projections 36, the material of the panel is stressed and the flat side surfaces 48 are formed with very small irregularities.

Figure 4:
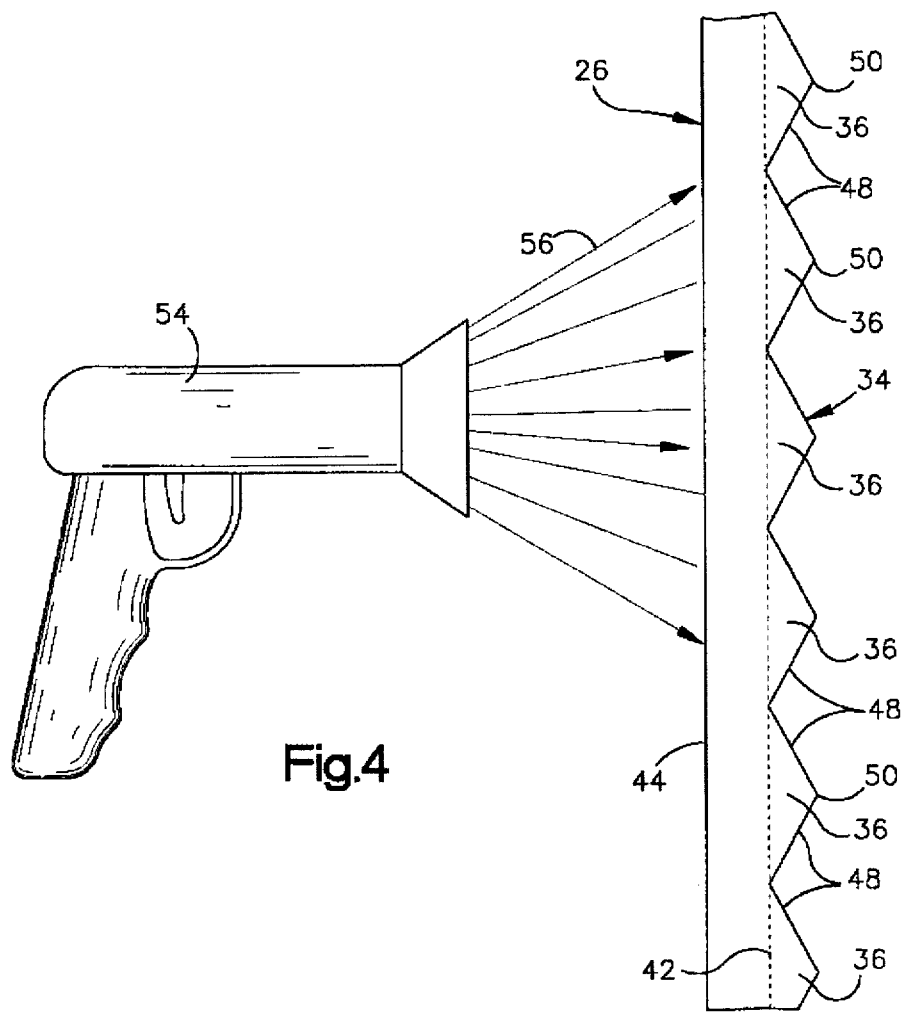
FIG. 4 is a schematic illustration depicting the manner in which an inner side surface of the panel of FIG. 2 is roughened prior to application of indicia to the inner side surface of the panel.

Once the pyramidal projections 36 (FIG. 3) have been formed in the outer side 34 of the panel 26, the inner side 44 of the panel is roughened prior to positioning of the layer 28 of indicia on the inner side surface 44 of the panel. The inner side surface of the panel may be roughened by an abrasive spray or sandblasting process which has been illustrated schematically in FIG. 4. During the abrasive spray process, a spray gun 54 directs a spray 56 of abrasive particles against the inner side surface 44 of the panel 26. This results in the formation of surface irregularities on the inner side 44 of the panel.

Although it is contemplated that it may be preferred to form the pyramidal projections 36 prior to roughening the inner side surface 44 of the panel 26, the inner side surface 44 of the panel 26 could be roughened before the pyramids 36 are formed on the outer side 34 of the panel. It is also contemplated that the inner side 44 of the panel 26 could be roughened in ways other than the use of an abrasive spray.

As was previously mentioned, very small imperfections or irregularities are formed in the side surfaces 48 of the pyramidal projections 36 (FIG. 3) during formation of the pyramidal projections. These small surface irregularities distract from the overall appearance of the outer side 34 of the panel 26. In addition, the irregularities formed in the side surfaces 48 of the pyramidal projections 36 tend to interfere with clear viewing of the layer 28 of indicia.

Although the very small irregularities formed in the side surfaces 48 of the pyramidal projections 36 during machining of the pyramidal projections are in many ways objectionable, they do have the advantage of dispersing sunlight which is reflected from the side surfaces in such a manner as to tend to minimize specular reflectance. In addition, the irregularities formed in the side surfaces 48 of the pyramidal projections 36 tend to diffuse ambient light to which the outer side 34 of the panel 26 is exposed in such a manner as to promote obscuring of characters in the layer 28 of indicia when the light source 16 is de-energized. Therefore, the very small surface irregularities or imperfections in the side surfaces 48 of the pyramidal projections 36 have both desirable and undesirable attributes.

In accordance with another feature of the present invention, the outer side 34 of the panel 26 is covered with a thin film coating of material after the pyramidal projections 36 have been formed. The thin film coating reduces the magnitude and roughness of the irregularities in the flat side surfaces 48 of the pyramidal projections 36 without completely eliminating the irregularities. This results in the detrimental appearance of the irregularities being minimized. In addition, interference by the irregularities with viewing of the layer 28 of indicia is minimized.

The thin film does not completely eliminate the irregularities. Therefore, the flat side surfaces 48 of the pyramidal projections 36 are sufficiently irregular to disperse light reflected from the side surfaces. Of course, dispersing the light reflected from the side surfaces 48 tends to minimize specular reflection from the side surfaces.

When the thin film is to be applied to the pyramidal projections, it is preferred to use the same monomer which was used to make the polymer panel 26. The panel 26 is formed of a polymer of methyl methacrylate. The pyramidal projections 36 are coated with a monomer of methyl methacrylate. The monomer of methyl methacrylate is effective to soften the polymethyl methacrylate forming the pyramidal projections 36 and to at least partially fill the small crevices and recesses formed during machining of the pyramidal projections 36. However, even after the thin film of the monomer has been applied to the pyramidal projections 36 and polymerized, surface irregularities will remain in the sides 48 of the pyramidal projections to scatter light reflected from the surfaces and thereby minimize specular reflectance.

Figure 5:
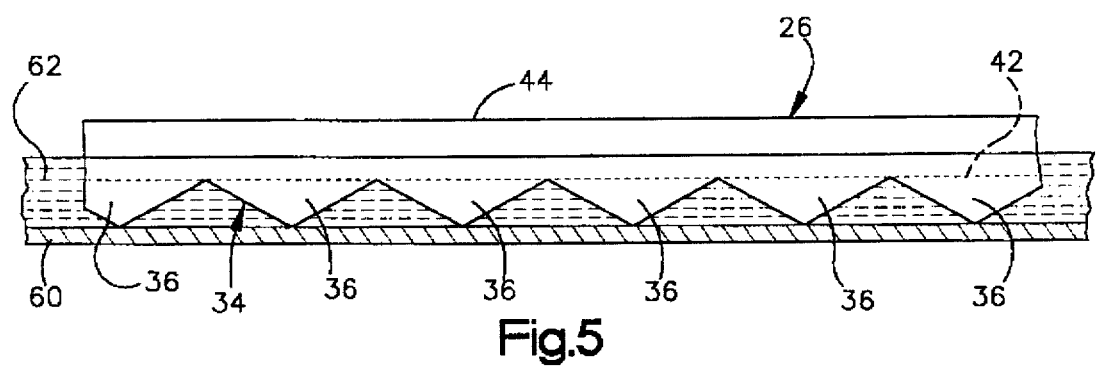
FIG. 5 is a schematic illustration depicting the manner in which a coating of a monomer of a polymer forming the panel is applied to the pyramidal projections on one side of the panel.

It is contemplated that the thin film coating could be applied to the pyramidal projections 36 in many different ways. In one specific instance, a trough or pan 60 (FIG. 5) is partially filled with a body 62 of liquid methyl methacrylate monomer. The body 62 of liquid has a depth which is just slightly greater than the height of the pyramidal projections 36. The outer panel 26 is placed in the trough 60 with the pyramidal projections 36 downward (FIG. 5). The panel 26 was left in the trough 60 of the methyl methacrylate monomer for a relatively short time, approximately three minutes.

After the panel 26 was removed from the trough 60, excess liquid was blown off of the side 34 with air. As this occurred, a very thin film or coating 66 (FIG. 6) of the methyl methacrylate monomer was left over the outer side 34 of the panel 26. The thin film 66 of the methyl methacrylate monomer polymerized to bond and become unitary with the pyramidal projections 36.

Figure 6:
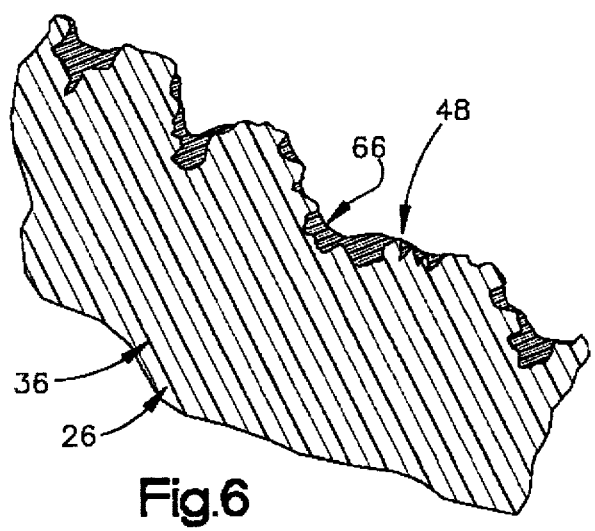
FIG. 6 (on sheet one of the drawings) is a greatly enlarged schematic illustration depicting the manner in which a thin film monomer coating partially repairs a side surface of a pyramidal projection on the panel.

The relationship of the thin film 66 of methyl methacrylate to the side surface 48 of a pyramidal projection 26 is illustrated schematically in FIG. 6. The thin film 66 of methyl methacrylate fills or at least partially fills small sharp crevices or fissures formed in the side surface 48 of the pyramidal projections 36 during machining of the pyramidal projections. However, the thin film 66 does not have sufficient thickness to eliminate larger surface irregularities. The result is that the pyramidal projections 36 have side surfaces 48 with small irregularities having an undulating characteristic rather than a jagged characteristic. This results in the side surface 48 of the pyramidal projections having a pleasing satin appearance.

The thin film 66 of methyl methacrylate polymerizes and bonds with the material of the panel 26 to form a unitary structure having a high degree of optical clarity. The satin finish on the side surface 48 of the pyramidal projection 36 provides minimal distortion to viewing the layer 28 of indicia when the light source 16 is energized. However, when the light source 16 is de-energized, the irregularities in the surfaces 48 on each of the pyramidal projections 36 tends to disperse reflected light in a manner which minimizes specular reflection.

The layer 28 of indicia includes opaque areas 70 and transparent areas 72 (FIG. 3). The transparent areas 72 have a configuration corresponding to the configuration of alphanumeric characters. The opaque areas 70 are formed of black ink while the transparent areas 72 are formed of polymethyl methacrylate. The transparent areas 72 represent characters and have a surface area which is at least twenty times the surface area of the base 40 of a pyramidal projection 36.

The opaque areas 70 and transparent areas 72 of the layer 28 of indicia are applied to the roughened inner side surface 44 of the panel 26. By roughening the inner side 44 of the panel 26 before applying the layer 28 of indicia to the inner side of the panel, an irregular surface configuration is imparted to the opaque areas 70. When the light source 16 is de-energized and ambient light is transmitted through the transparent panel 26 to the opaque areas 70, a portion of the light is absorbed by the black opaque areas. The portion of the light which is reflected from the black opaque areas 70 is dispersed by the surface irregularities. By dispersing the reflected light, any tendency for specular reflectance to occur from the surface of the opaque areas 70 is minimized.

Ambient light transmitted through the panel 26 to the transparent areas 72 (FIG. 3) is conducted through the transparent areas into the body 30 of light diffusing material. In one specific embodiment of the invention, the body 30 of light diffusing material was formed of polymethyl methacrylate in which particles of polystyrene were suspended. The light transmitted through the transparent areas 72 impinges against the polystyrene particles and is dispersed in the body 30. Thus, the body 30 of light diffusing material acts as a trap for ambient light which is transmitted through the panel 26 and transparent areas 72 into the body 30 of light diffusing material.

The characteristics of the body 30 of light diffusing material is such that the amount of ambient light which is reflected back through the panel 26 to an observer from the opaque areas 70 is the same as the amount of light which is reflected back from the transparent areas 72. Since the amount of light reflected back to the observer from the opaque and transparent areas 70 and 72 of the layer 28 of indicia is the same, the observer cannot make out the characters formed by the transparent areas 72.

When the light source 16 is energized, light is transmitted through the body 30, transparent area 72 and panel 26 to the observer. The light source 16 has sufficient intensity to enable the transparent areas 72 to be clearly defined by the light which is transmitted through the body 30. Of course, none of the light from the light source 16 is transmitted through the opaque areas 70. Therefore, the characters formed by the transparent areas 72 are clearly defined when the light source 16 is energized.

When light from the light source 16 is transmitted from the panel to the observer, the sloping side surfaces 48 of the pyramidal projections 34 cause refraction of the light to enable the characters formed by the transparent areas 72 of the layers 28 of indicia to be viewed from a relatively wide angle. Thus, in one specific embodiment of the invention, the characters formed by the transparent areas 72 of the layer 28 of indicia could be viewed within an angle of 65° on either side of and perpendicular to the inner side 44 of the panel 26. This wide viewing angle (130°) enables an observer to clearly make out the characters formed by the transparent areas 72 of the layer 28 of indicia when the observer is offset to either the left or the right of the pushbutton 18.

In view of the foregoing description it is apparent that the present invention provides a new and improved display system 22 which has minimum specular reflectance. The display system 22 is relatively compact and contains indicia 28 which is readable in bright sunlight when a light source 16 within the display system is energized. However, the indicia 28 is not readable, even in bright sunlight, when the light source 16 in the display system is de-energized.

The display system includes a light source 16 which is disposed within a housing 12. A panel 26 is connected with the housing 12 and is formed of transparent material. Indicia 28 is disposed in the housing at a location between an inner side 44 of the panel and the light source 16. The indicia 28 is observable through the panel 26 when the light source 16 is energized. The indicia 28 is obscured when the light source 16 is de-energized.

The outer side 34 of the panel 26 includes an array of pyramidal projections 36 which extend across the indicia. The pyramidal projections 36 disperse light to minimize specular reflectance. This feature is particularly advantageous when the outer side 34 of the panel 26 is exposed to bright sunlight.

Indicia 28 formed by opaque areas 70 and transparent areas 72 is disposed between the light source 16 and an inner side 44 of the panel 26. A body 30 of light diffusing material is disposed between the indicia 28 and the light source 16. When the panel 26 is exposed to bright sunlight, the sunlight is transmitted through the transparent areas 72 of the indicia 28 into the body 30 of light diffusing material. The amount of light reflected from the transparent areas 72 of the indicia 28 is the same as the amount of light reflected from the opaque area 70 of the indicia. Therefore, the indicia 28 is obscured in bright sunlight.

The panel 26 is formed of a transparent polymer. A thin film 66 of a monomer used to make the polymer of which the panel is formed is applied over the pyramidal projections 36 on the outer side 34 of the panel. The thin film 66 of the monomer only partially eliminates roughened areas on side surfaces 48 of the pyramidal projections 36. This enables the pyramidal projections 36 to have an exterior surface which is rough enough to disperse sunlight and avoid specular reflections while still having a pleasing satin appearance.

Having described the invention, the following is claimed:

1. A display system comprising a housing, energizeable means disposed in said housing for producing light when said energizeable means is energized, said energizeable means being ineffective to produce light when said energizeable means is de-energized, a panel connected with said housing and formed of a transparent material which is a polymer, said panel having an outer side exposed to ambient light and an inner side which is opposite from said outer side and exposed to light from said energizeable means when said energizeable means is energized, said outer side of said panel being coated with a thin coating of a monomer, and indicia disposed in said housing at a location between said inner side of said panel and said energizeable means, said indicia being observable through said panel when said energizeable means is energized and being obscured when said energizeable means is de-energized, said outer side of said panel including an array of pyramidal projections which project outward away from said inner side of said panel, said array of pyramidal projections extends across said indicia so that light from said energizeable means passes through said array of pyramidal projections to enable said indicia to be observed when said energizeable means is energized, each of said pyramidal projections of said array of pyramidal projections includes a polygonal base and a plurality of flat sides which extend away from said polygonal base and away from said energizeable means to an apex to enable light from said energizeable means to enter at least a plurality of said pyramidal projections through said polygonal base of each pyramidal projection of said plurality of pyramidal projections when said energizeable means is energized.

2. A display system as set forth in claim 1 wherein said inner side of said panel is roughened to have an irregular surface configuration, said indicia including opaque material disposed on said roughened inner side of said panel.

3. A display system as set forth in claim 1 wherein said indicia includes opaque areas and transparent areas through which light from said energizeable means passes when said energizeable means is energized, said display system further including a diffuser disposed between said indicia and said energizeable means, said diffuser receiving and diffusing light transmitted through said outer side of said panel and said transparent areas of said indicia to obscure said indicia when said energizeable means is de-energized.

4. A display system as set forth in claim 1 further including an electrical switch disposed in said housing, said panel being movable relative to said housing to effect actuation of said electrical switch.

5. A display system as set forth in claim 1 wherein said indicia includes opaque areas and transparent areas, said opaque areas and said transparent areas of said indicia being exposed to ambient light transmitted through said panel, said opaque and transparent areas of said indicia being effective to reflect the same amount of ambient light when said energizeable means is de-energized to thereby obscure said indicia.

6. A display system comprising a housing, energizeable means disposed in said housing for producing light when said energizeable means is energized, said energizeable means being ineffective to produce light when said energizeable means is de-energized, a panel connected with said housing and formed of a transparent material, said panel having an outer side exposed to ambient light and an inner side which is opposite from said outer side and exposed to light from said energizeable means when said energizeable means is energized, and indicia disposed in said housing at a location between said inner side of said panel and said energizeable means, said indicia being observable through said panel when said energizeable means is energized ant being obscured when said energizeable means is de-energized, said inner side of said panel being roughened to have an irregular surface configuration, said indicia including opaque material disposed on said roughened inner side of said panel, said outer side of said panel including an array of pyramidal projections which project outward away from said inner side of said panel, said array of pyramidal projections extends across said indicia so that light from said energizeable means passes through said array of pyramidal projections to enable said indicia to be observed when said energizeable means is energized.

7. A display system as set forth in claim 6 wherein said panel is formed of a polymer, said outer side of said panel being coated with a thin coating of a monomer.

8. A display system as set forth in claim 6 wherein said indicia includes transparent areas through which light from said energizeable means passes when said energizeable means is energized, said display system further including a diffuser disposed between said indicia and said energizeable means, said diffuser receiving and diffusing light transmitted through said outer side of said panel and said transparent areas of said indicia to obscure said indicia when said energizeable means is de-energized.

9. A display system as set forth in claim 6 further including an electrical switch disposed in said housing, said panel being movable relative to said housing to effect actuation of said electrical switch.

10. A display system as set forth in claim 6 wherein said indicia includes transparent areas, said opaque material and said transparent areas of said indicia being exposed to ambient light transmitted through said panel, said opaque material and transparent areas of said indicia being effective to reflect the same amount of ambient light when said energizeable means is de-energized to thereby obscure said indicia.

11. A display system as set forth in claim 6 wherein each of said pyramidal projections includes a polygonal base having a first area, said indicia including a transparent area which cooperates with said opaque material to define a character having an area which is at least twenty times as great as said first area.

12. A display system as set forth in claim 6 wherein each of the pyramidal projections of said array of pyramidal projections has side surface areas which dissipate heat when said energizeable means is energized to produce light.

13. A display system comprising a housing, energizeable means disposed in said housing for producing light when said energizeable means is energized, said energizeable means being ineffective to produce light when said energizeable means is de-energized, a panel connected with said housing and formed of a transparent polymer, said panel having an outer side exposed to ambient light and an inner side which is opposite from said outer side and exposed to light from said energizeable means when said energizeable means is energized, and indicia disposed in said housing at a location between said inner side of said panel and said energizeable means, said indicia being observable through said panel when said energizeable means is energized and being obscured when said energizeable means is de-energized, said outer side of said panel including an array of projections which project outward away from said inner side of said panel, said array of projections extends across said indicia so that light from said energizeable means passes through said array of projections to enable said indicia to be observed when said energizeable means is energized, said array of projections being coated with a thin coating of a monomer to partially eliminate roughened areas on surfaces of projections in said array of projections.

14. A display system as set forth in claim 13 wherein said panel is formed of a polymer of methyl methacrylate and said thin coating of a monomer is a thin coating of a monomer of methyl methacrylate.

15. A display system as set forth in claim 13 wherein each of said projections includes a polygonal base and a plurality of flat sides which extend away from said polygonal base and away from said energizeable means to an apex to enable light from said energizeable means to enter at least a plurality of said projections through said polygonal base of each projection of said plurality of projections when said energizeable means is energized.

16. A display system as set forth in claim 13 wherein said inner side of said panel is roughened to have an irregular surface configuration, said indicia including opaque material disposed on said roughened inner side of said panel.

17. A display system as set forth in claim 13 wherein said indicia includes opaque areas and transparent areas through which light from said energizeable means passes when said energizeable means is energized, said display system further including a diffuser disposed between said indicia and said energizeable means, said diffuser receiving and diffusing light transmitted through said outer side of said panel and said transparent areas of said indicia to obscure said indicia when said energizeable means is de-energized.

18. A display system as set forth in claim 13 further including an electrical switch disposed in said housing, said panel being movable relative to said housing to effect actuation of said electrical switch.

19. A display system as set forth in claim 13 wherein said indicia includes opaque areas and transparent areas, said opaque areas and said transparent areas of said indicia being exposed to ambient light transmitted through said panel, said opaque and transparent areas of said indicia being effective to reflect the same amount of ambient light when said energizeable means is de-energized to thereby obscure said indicia.

20. A display system as set forth in claim 13 wherein each of said projections includes a polygonal base having a first area, said indicia including an opaque area and a transparent area which define a character having an area which is at least twenty times as great as said first area.

21. A display system as set forth in claim 13 wherein each of the projections of said array of projections has side surface areas which dissipate heat when said energizeable means is energized to produce light.

* * * * *

UNITED STATES PATENT AND TRADEMARK OFFICE
CERTIFICATE OF CORRECTION

PATENT NO. : 5,544,019
DATED : August 6, 1996
INVENTOR(S) : Vanacan Tatavoosian, Robert P. Helstern and John J. Lombardo It is certified that error appears in the above-indentified patent and that said Letters Patent is hereby corrected as shown below:

Column 9, line 5, change "ant" to --and--.

Signed and Sealed this

Tenth Day of December, 1996

Attest:

BRUCE LEHMAN

*Attesting Officer*    *Commissioner of Patents and Trademarks*